2,694,094

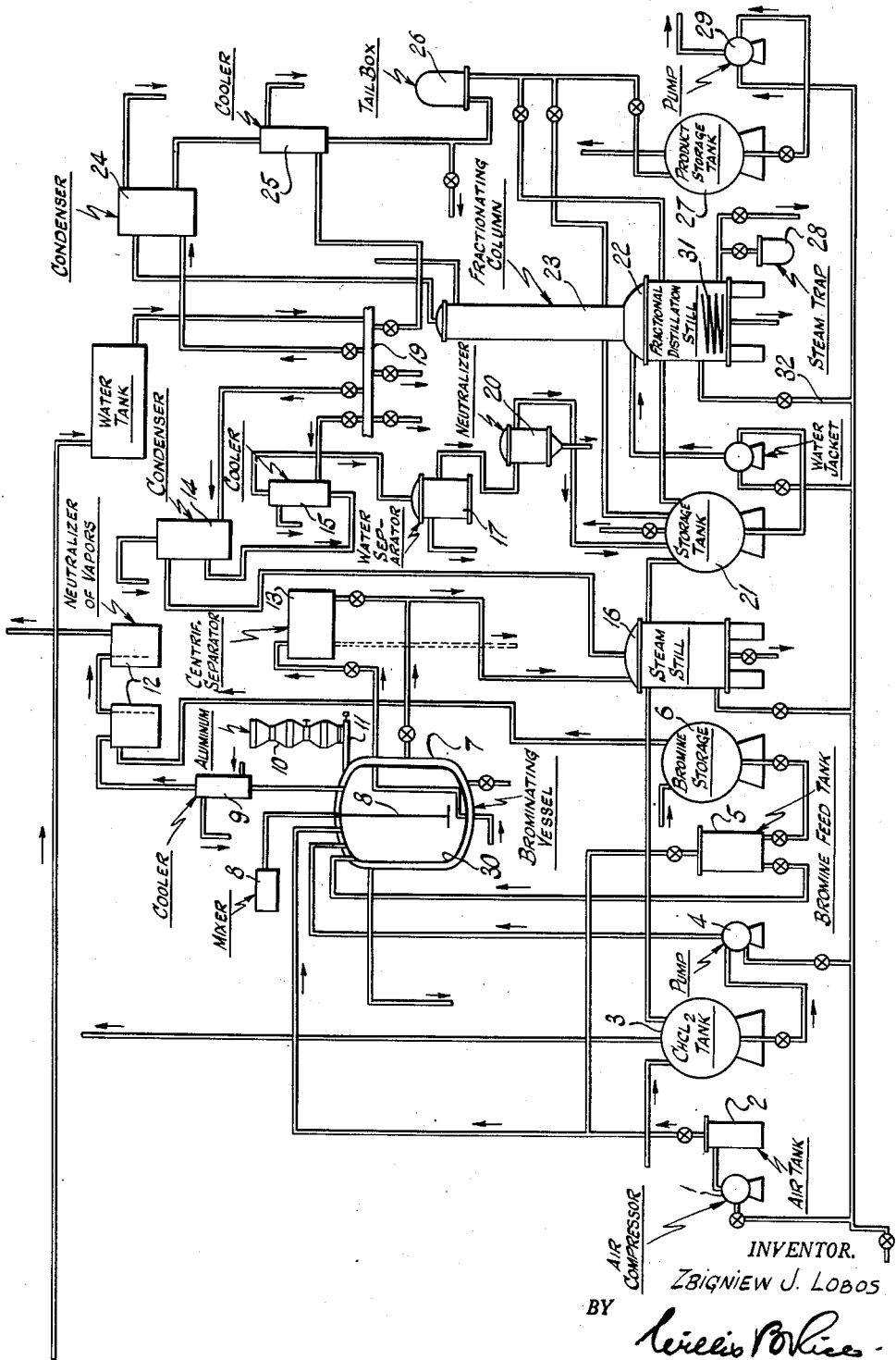

PROCESS FOR MAKING CHLOROBROMO-
METHANE

Zbigniew J. Lobos, Brooklyn, N. Y., assignor to Stop-Fire, Inc., Brooklyn, N. Y., a corporation of New York Application October 25, 1950, Serial No. 192,089

8 Claims. (Cl. 260—658)

This invention comprises a process for the manufacture of chlorobromomethane, which for convenience in this specification will be referred to as CBM. The formula is given as $CH_2ClBr$. The basic equation by which it may be derived is $$6CH_2Cl_2 + 3Br_2 + 2Al = 6CH_2ClBr + 2AlCl_3$$

This reaction as given in terms to produce 2000 units of $CH_2ClBr$ is 1310# methylene chloride, +1236# bromine +140# aluminum will form 2000# CBM+686# aluminum chloride.

This reaction as heretofore conducted has resulted in great waste because of the side reactions and back reactions which occur.

It is an object of this invention to provide a new and improved process which will proceed almost wholly in the form of the basic reaction without the wasteful production of useless by-products and in such a manner that such by-products as are formed can be returned to and fully utilized in the process.

It is a further object to provide a process which will not be so critical as to temperatures, pressures and rates of feed of the materials, but which nevertheless can be relied upon finally to convert substantially all of the raw materials into the end products desired.

In the processes heretofore common, the reaction is conducted by admitting a considerable quantity of methylene chloride into a chamber filled with aluminum in finely divided form. The reaction is started by adding small quantities of bromine and then, while watching the reaction, alternately adding more methylene chloride and more bromine. Care is required to keep the proportions and the temperature such as to prevent the waste of the methylene chloride or the bromine or the aluminum.

In accordance with this process instead of gradually adding alternately the methylene chloride and the bromine to the whole mass of aluminum, the bromine is first added to an excess quantity of methylene chloride. Since the aluminum is the catalytic agent by which one chlorine atom is taken from the methylene chloride and replaced by bromine, the rate of the principal reaction can be controlled by the rate of the addition of the aluminum. Moreover, since the methylene chloride is in excess at all times, the tendency for the formation of methylene bromide is reduced to a minimum and since free bromine is present during the entire reaction, and the amount of aluminum is limited, the tendency to produce methane is also minimum.

The invention accordingly comprises a process composing the advantages and accomplishing results and involving the relationship of the steps one to another which will be exemplified in a process herein described and the scope of the application of the invention will be indicated in the claims.

For a fuller understanding of the nature and objects of the invention, reference should be had to the following detailed description taken in connection with the accompanying drawing, which is a diagram of apparatus by which the process may be carried out.

In the drawing, the methylene chloride, which is liquid at normal temperatures, is contained in a storage tank 3 from which it may be pumped by a pump 4 into the brominating vessel 7. The bromine which is also liquid is stored in a tank 6 from which it can be moved to a bromine feed tank 5. The top of this tank connects presser 1 and the bromine is forced into vessel 7 from tank 5 by the air pressure. The aluminum in finely comminuted form is carried in a vessel 10 from which it is with a tank 2 of compressed air, maintained by a compressor fed to the brominating vessel 7 by a worm feed 11.

The brominating vessel 7 is double walled as shown at 30, so that the temperature may be kept from rising too far. It is also provided with a motor driven mixer 8 to mix the two liquids and to mix the aluminum into them. The raw materials are all fed into the vessel 7 at the top.

The process may be conveniently described quantatively for the production of 2000 pounds CBM. For this purpose we pump into vessel 7 5000 pounds methylene chloride and then transfer into the vessel 1260 pounds of bromine. This, as will be seen, is the full quantity of bromine; but the methylene chloride is greatly in excess. This is of no significance, however, as far as costs are concerned, since the excess is not lost.

No reaction takes place in the vessel 7 until we start to feed in the aluminum. This is done very slowly because the resultant reaction is exothermic and the rate of feed must not cause excessive rise in temperature. Even so, vigorous cooling is necessary by circulating cold water in jacket 30.

The temperature is maintained between 26° and 30° C. until near the end. When the concentration of bromine is very small, the temperature may be permitted to rise to 40° C. The time required for the reaction is limited by the cooling, since the rate of reaction must not exceed the rate at which the heat can be carried off.

When the quantity of aluminum added equals the stoichemical quantity, i. e. 140#, the liquid, now largely CBM and aluminum chloride is tested for bromine. If bromine is present, more aluminum can be added until no bromine is present. Then the liquid in vessel 7 may be allowed to rest for about two hours, to allow the aluminum chloride to settle. This settling leaves the upper layers of the liquid sufficiently free from aluminum chloride to permit the top half of the liquid in vessel 7 to be transferred direct to a steam still 16.

The gases evolving in vessel 7 may be cooled by a cooler 9 and neutralized by sodium hydroxide at 12 before being vented.

The liquid from the lower half of the vessel is passed into a centrifugal separator 13 which frees the liquid from aluminum chloride to permit it to be admitted to the still. The aluminum chloride so separated may be recovered. A part of the aluminum chloride is not separated because it remains in solution.

The distillation of the portion containing the CBM in still 16 must be carried out slowly at first, because of the evolution of gases in the first stages of the distillation. These gases are largely chlorine with some methane and some bromine.

The vapors from the still are condensed in a cooler 14 and cooled at 15 and passed through the water separator 17 and neutralizer 20 filled with sodium hydroxide and thence to the intermediate storage tank 21.

From tank 21, the neutral and dehydrated liquid comprising CBM mixed with methylene chloride and methylene bromide is carried to a fractional distillation still 22, having a rectification tower 23 filled with Rashig rings.

The numeral 19 represents the cold water supply pipes from which the cooling water is led to the various pieces of apparatus.

The fractionating still 22 may have a temperature control coil 31, supplied with water from a supply 32 and it is preferably equipped with a steam trap 28.

In the fractionating column five fractions are preferably collected:

(1) The first fraction given off at 39° to 45° C. is largely the unreacted methylene chloride with small quantities of CBM. This fraction may be returned to the process by putting it back into tank 3, and is thus completely utilized.

(2) The second fraction given off between 45° and 66.5° C. contains much larger quantities of CBM in solution with methylene chloride. It is advisedly returned direct to tank 21 for redistillation.

(3) The third fraction given off between 66.5° and

69° C. is substantially pure CBM which is led through a condenser 24, cooler 25, tailbox 26 to product storage tank 27, from which it may be dispensed by a pump 29.

(4) The fourth fraction coming off between 69° and 80° C. is CBM, but containing also methylene bromide. This like the second fraction may be returned to tank 21 for redistillation. In that tank, mixed as it is with methylene chloride, the methylene bromide will in part be converted to CBM and separated by the redistillation.

(5) The fifth fraction comes off between 80° and 98° C. and is largely methylene bromide containing a small quantity of CBM. This fraction is returned direct to the brominating vessel 7 and there largely converted to CBM.

This process permits all side reaction or back reaction products to be returned to the process at a point where they may be fully utilized. Thus the only final products formed are CBM and aluminum chloride. Thus there is no loss of bromine as methylene bromide.

In the former process which has been outlined, the loss of bromine is about 15%. Hence, based on bromine, the yield of CBM is about 15% greater by the new process.

Moreover, because of the high concentration of bromine employed, we avoid the breakdown of methylene chloride by the aluminum to produce methane. This fact saves from 20 to 26% of the aluminum and 12 to 20% of the methylene chloride which the old process required.

There is a further distinct advantage which flows from the fact that there is little reaction between the methylene chloride and the bromine, except as the aluminum is added, and that is, it is possible to interrupt the reaction at any time convenience requires, without any parasitic reactions taking place, and without loss of product, whereas if the former process be interrupted, reaction will commence between the aluminum and the methylene chloride.

Since certain changes may be made in carrying out the above process without departing from the scope of the invention, it is intended that all matter contained in the above description shall be interpreted as illustrative and not in a limiting sense.

It is to be understood that the following claims are intended to cover all of the generic and specific features of the invention herein described, and all statements of the scope of the invention which as a matter of language might be said to fall therebetween.

What is claimed is:

1. The process of making chlorobromomethane, which comprises reacting upon a mixture of methylene chloride and bromine, with aluminum, the aluminum being added slowly, whereby the methylene chloride and bromine are in excess of that with which the aluminum can react, while keeping the temperature between 26° and 30° C.

2. The process of making chlorobromomethane, which comprises reacting upon a mixture of methylene chloride and bromine, with aluminum, the aluminum being added slowly, whereby the methylene chloride and bromine are in excess of that with which the aluminum can react, while keeping the temperature between 26° and 30° C., then separating out the aluminum chloride so formed and then separating the CBM from the remaining products by fractional distillation.

3. The process of making chlorobromomethane, which comprises reacting upon a mixture of methylene chloride and bromine with aluminum, the aluminum being added gradually and the mixture being cooled to maintain the temperature of the reaction between 26° and 30° C.

4. The process of making chlorobromomethane, which comprises reacting upon a mixture of methylene chloride and bromine with aluminum, the aluminum being added gradually and the mixture being cooled to maintain the temperature of the reaction between 26° and 30° C., then separating out the aluminum chloride so formed and then separating the CBM from the remaining products by fractional distillation.

5. The process of forming chlorobromomethane, which comprises mixing a desired quantity of bromine with more than the stoichemical quantity of methylene chloride and then gradually adding aluminum to the mixture while cooling, at a rate to maintain the temperature between 26° and 30° C. until the mixture is free from unreacted bromine and then separating out the CBM thus formed.

6. The process of forming chlorobromomethane which comprises mixing a desired quantity of bromine with more than the stoichemical quantity of methylene chloride and then gradually adding aluminum to the mixture while cooling, at a rate to maintain the temperature between about 26° and 30° C. until the mixture is free from unreacted bromine and then separating the $AlCl_3$ and the CBM thus formed and returning the other products to the process for reuse.

7. The process of forming chlorobromomethane which comprises mixing a desired quantity of bromine with more than the stoichemical quantity of methylene chloride and then gradually adding aluminum to the mixture while cooling, at a rate to maintain the temperature between about 26° to 30° C. until the mixture is free from unreacted bromine, separating the $AlCl_3$ from the other compounds and then separating out from the other compounds, by fractional distillation those products which come off between 66.5° and 69° C., while returning all lower and higher fractions to the process.

8. The process of forming chlorobromomethane which comprises mixing a desired quantity of bromine with more than the stoichemical quantity of methylene chloride and then gradually adding aluminum to the mixture while cooling, at a rate to maintain the temperature between about 26° to 30° C. until the mixture is free from unreacted bromine, separating the $AlCl_3$ from the other products thus formed and then separating the other products into fractions, by fractional distillation, the first fraction from about 39° to 45° C., the second from about 45° to 66.5° C., the third from 66.5° to 69° C., the fourth from 69° to 80° C. and the fifth from 80° to 98° C., returning the first and fifth fraction to the process, returning the second and fourth for redistillation and storing the third for use.

References Cited in the file of this patent

UNITED STATES PATENTS

| Number | Name | Date |
|---|---|---|
| 2,347,000 | Scherer et al. | Apr. 18, 1944 |